United States Patent
Otten et al.

(10) Patent No.: US 6,857,668 B2
(45) Date of Patent: Feb. 22, 2005

(54) REPLACEABLE CORROSION SEAL FOR THREADED CONNECTIONS

(75) Inventors: Gregory K. Otten, Houston, TX (US); Richard C. Griffin, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 48 days.

(21) Appl. No.: 10/051,428

(22) Filed: Jan. 18, 2002

(65) Prior Publication Data

US 2002/0140229 A1 Oct. 3, 2002

Related U.S. Application Data

(63) Continuation-in-part of application No. 09/679,470, filed on Oct. 4, 2000, now Pat. No. 6,811,189
(60) Provisional application No. 60/262,809, filed on Jan. 20, 2001.

(51) Int. Cl.[7] .................................. F16L 25/00
(52) U.S. Cl. .................... 285/334; 285/333; 285/355; 285/332.3
(58) Field of Search .................. 285/333, 334, 285/355, 390, 332.2, 332.3, 89

(56) References Cited

U.S. PATENT DOCUMENTS

| | | | | |
|---|---|---|---|---|
| 1,590,357 A | * | 6/1926 | Feisthamel | 285/332.1 |
| 1,999,706 A | * | 4/1935 | Spang | 285/116 |
| 2,073,093 A | * | 3/1937 | Brantly | 285/114 |
| 2,211,179 A | * | 8/1940 | Stone | 285/334 |
| 2,289,271 A | * | 7/1942 | Kane et al. | 285/115 |
| 2,308,066 A | * | 1/1943 | Evans | 285/116 |
| 2,380,690 A | * | 7/1945 | Graham | 285/114 |
| 2,992,019 A | * | 7/1961 | MacArthur | 285/110 |
| 4,085,951 A | * | 4/1978 | Morris | 285/334 |
| 4,253,687 A | * | 3/1981 | Maples | 285/332.3 |
| 4,706,997 A | * | 11/1987 | Carstensen | 285/13 |
| 4,988,127 A | * | 1/1991 | Cartensen | 285/94 |
| 5,826,921 A | * | 10/1998 | Woolley | 285/334 |
| 6,550,822 B2 | * | 4/2003 | Mannella et al. | 285/333 |

* cited by examiner

*Primary Examiner*—James M. Hewitt
(74) *Attorney, Agent, or Firm*—C. James Bushman; Browning Bushman P.C.

(57) ABSTRACT

The threaded connection between the pin and the box ends of two pipes is sealed externally and internally to protect the threads in the connection from exposure to corrosive fluids. Seals are provided at each axial end of the threads. External seals are formed by metal-to-metal engagement between the pin and box and a third metal body secured circumferentially about the pin. The metal body may be fashioned into a desired annular pin seal surface to mate with and seal with the box at full makeup of the connection. The metal body can be removed and replaced as required to repair or reconstructed the pin seal surface.

6 Claims, 2 Drawing Sheets

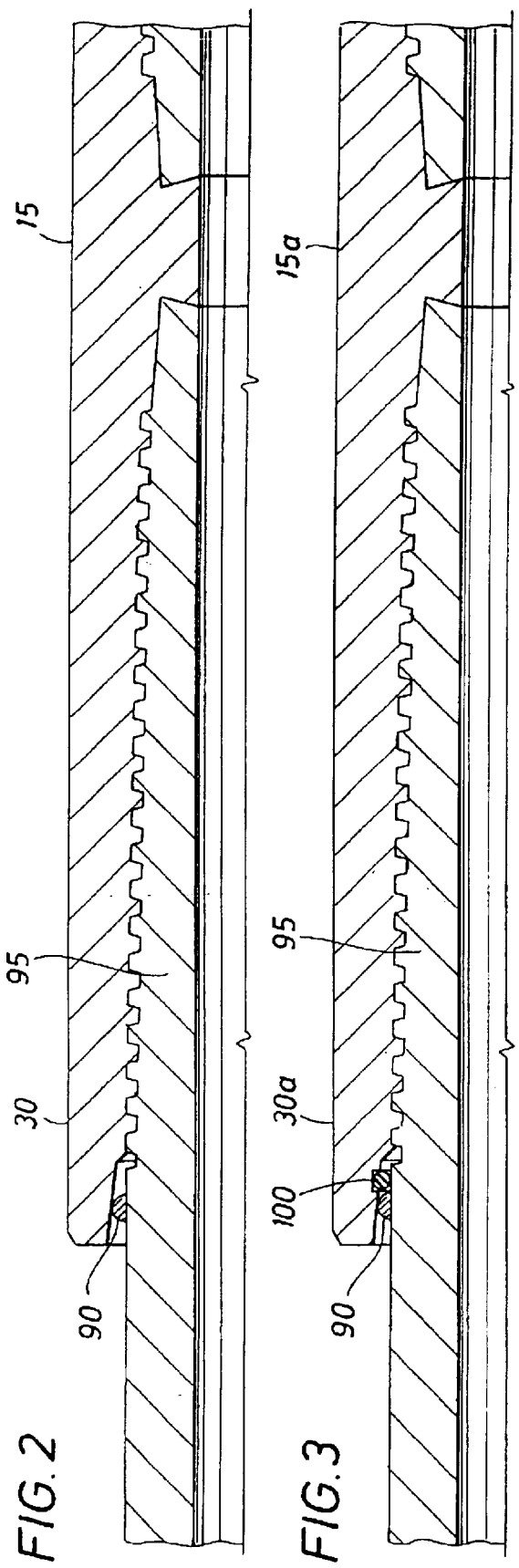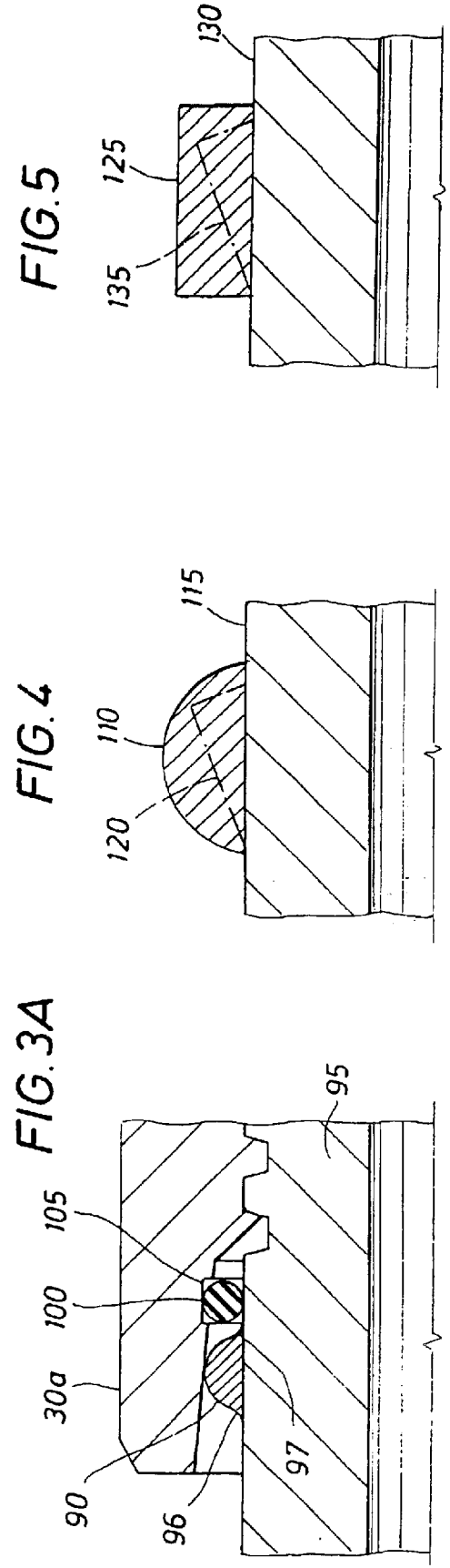

REPLACEABLE CORROSION SEAL FOR THREADED CONNECTIONS

CROSS REFERENCE TO RELATED APPLICATIONS

This application is a continuation-in-part of U.S. patent application Ser. No. 09/679,470 filed Oct. 4, 2000, now U.S. Pat. No. 6,811,189 assigned to the Assignee of the present application.

This application claims priority from U.S. Provisional Patent Application Ser. No. 60/262,809 filed Jan. 20, 2001 and assigned to the Assignee of the present application.

FIELD OF THE INVENTION

The present invention relates to threaded connectors used to secure the ends of tubular bodies together. More particularly, the present invention relates to threaded connections provided with replaceable seals to protect the threads in pipe connections from exposure to corrosive fluids.

BACKGROUND OF THE INVENTION

Pipelines that extend through saltwater bodies are employed for multiple purposes, often associated with the drilling of oil and gas wells and the production and distribution of the oil and gas produced by the wells. When the pipelines are not buried or otherwise solidly anchored within the saltwater body, they are subjected to dynamic loadings that can eventually cause the pipelines to rupture or otherwise fail. The stresses induced by dynamic loading in the connections of the individual tubular bodies forming the pipeline are of particular concern.

Jointed pipelines that are secured together by the threaded engagement of pin and box connectors at the ends of individual pipe sections are employed in marine riser pipes as well as submerged pipelines and other bottom-to-surface supply lines. The marine riser pipelines are typically constructed of tubular pipe sections that are secured together at their ends by special connectors designed to withstand the destructive effects of the dynamic loading acting on the riser. The dynamic loading of the riser is caused by changing sea currents, changes in surface exerted tension resulting from wind and wave action against a surface support of the riser, and other factors.

The effects of dynamic loading on the connections used in marine applications may be offset, in part, by the use of connectors that have the strength required to withstand the forces imparted by the environment. Conventional riser connections typically employ heavy tool joint type connections that are welded onto the end of the pipe. These connections are very resistant to fatigue damage and often employ a metal-to-metal torque shoulder as an external seal, similar the design employed in a conventional drill pipe tool joint. Connections of this type have a very low stress concentration factor (SCF) and provide an environmental seal that prevents the seawater from contacting the threads in the connection.

The tool joint design is expensive to machine and requires the added step and expense of welding the connector to the pipe. The welding procedure also introduces a potential point of fatigue failure for the dynamically loaded connector. Moreover, as compared with a conventional threaded and coupled connection, the tool joint type connection is extremely heavy, requiring additional surface support.

Conventional threaded and coupled connections have been successfully employed, for short periods, as the outer riser in a marine installation. Such connections cost less than ⅙ the cost of tool joint type connectors. The long-term reliability of these conventional connections in a saltwater environment under dynamic loading conditions, however, is not reasonably predictable. The uncertainty stems from the fact that, when used as risers, the threads of conventional threaded and coupled connectors are exposed to salt water that can accelerate corrosion of the threaded area. The dynamic loading of the riser constantly flexes the connections laterally and imposes cyclical tension and compression stresses in the connected components. Any unengaged pin threads that have been machined into the pipe portion of the connection are exposed to the salt water. These exposed threads concentrate the stresses exerted on the pipe. Adding the effects of corrosion to the cyclical stress concentration unreasonably exposes the connection to a fatigue induced failure that will generally occur in the area of the last full thread formed on the body of the pin member of the connection.

The strength of a standard threaded and coupled connection is optimized by forming the pin threads such that the thread roots "run out" or continue to decrease in depth on the external surface of the pipe until they disappear at a point referred to as the "last scratch." The final turns of the threads do not make a full depth cut into the pipe body and are not normally intended to be engaged and covered by threads in the mating coupling. From the point of the last full threaded engagement with the box threads to the last scratch of the pin threads, the pin threads in a conventional threaded and coupled connection are exposed to the surrounding environment. The corrosive effects of saltwater in this area of exposure can accelerate the failure of a connector subjected to cyclical, dynamically induced forces.

U.S. patent application Ser. No. 09/679470, cited previously, discloses a connector design in which the normally exposed pin runout threads on fully engaged, threaded and coupled connections are sealed from saltwater to prevent corrosion of the threaded area that can accelerate fatigue-induced failure in dynamically loaded pipelines. The seals may be employed with conventional threaded and coupled connectors permitting the fabrication of pipelines that are inexpensive and lightweight as compared with pipelines constructed with conventional tool joint type connectors.

The external seal portion of the invention of application Ser. No. 09/679470 may be provided by metal-to-metal engagement between the pin and box or by an elastomeric annular seal compressed between the pin and box. The metal-to-metal external seal may be provided by engagement of the face of the box with a shoulder formed on the pin end of a non-upset pipe. The shoulder may also be provided by enlarging the pin outside diameter. Where an annular, elastomeric seal is provided, the seal may be carried on the outer surface of the pin body or may be disposed in the box of the connector.

The enlarged outside diameter of the pin portion of the parent application connector is formed by expanding the pipe wall radially outwardly. A frustoconical pin seal surface is machined externally on the enlarged radial area. When the connector is assembled, the pin seal surface engages a frustoconical box seal surface internally adjacent the end of the box. Engagement of the two seal surfaces forms an external seal that prevents salt water from entering the threaded area of the connection. During the manufacturing process, if the pin seal surface is not properly machined on the expanded body of the pipe, the entire pipe section can be rendered unusable. Similarly, if a properly machined seal becomes defective through subsequent mishandling or usage, the remaining expanded wall of the pipe may not be adequate for reconstructing or repairing the damaged seal, resulting in a loss of the complete pipe joint.

SUMMARY OF THE INVENTION

A metal-to-metal seal between the pin and box connection of a threaded tubular is formed externally of the pin on a tubular body comprising a metal seal base that is separately added to the external surface of the metal forming the pin end of the connection. An important part of the present invention is the provision of a third metal seal element in addition to the pin and box components that is separately added to the pin component to provide the desired pin seal surface.

In the event the seal formed on the seal base is damaged during construction, handling or use, the separately added seal base may be removed from the pin end and replaced with another seal base to provide the required pin seal surface. The tubular pipe body or joint on which the pin is formed may be reused multiple times by reconstructing or repairing the pin seal.

The outer surface of a tubular pin end connector is enlarged by welding a metal buildup onto the surface, or by the placement of an annular metal body about the surface, to form an external pin seal base. The pin seal base is machined on the welding buildup to form an annular pin sealing surface adjacent the pin thread pullout area of a completed threaded pin connection. Where an annular body is used to provide the pin seal base, the annular body may be premachined before being welded to the connector to provide the desired pin seal surface adjacent the pin thread pullout area. The pin sealing surface formed by either method is adapted to engage and seal with a mating box seal surface to protect the engaged pin and box threads of the connector from contact with the corrosive fluids within which the connection is deployed.

If the pin seal is improperly cut during the machining process or damaged during the handling and use of the connector, the welding buildup or annular metal body may be removed and replaced to provide a new pin sealing surface. Only the seal area of the pipe joint is reworked so that the pipe joint is conserved during this replacement process. By contrast, repair or reconstruction of a pin sealing surface on a pin connector of a pipe joint formed by radially expanding a tubular body wall so that the radial enlargement is an integral part of the pipe joint may not be possible. Such is the case for example where the enlargement would not have sufficient radial extension to accommodate the required machining to effect the repair or where the tubular wall would be undesirably reduced in thickness by the required machining repair.

The enlargement of the pin end connector of the present invention may be made by applying a weld bead to the outside diameter of the tubular body or by welding or otherwise securing an annular metal ring to the external circumferential surface of the body. Once the enlargement is in place on the tubular body, the desired pin sealing surface may be machined into the weld bead or the annular metal ring. The metal ring may also be machined with the desired sealing surface before being secured to the tubular body.

The pin sealing surface may assume the configuration of a frustroconical surface to provide an expanded area for sealing engagement with a correspondingly shaped box seal surface or may be formed as an annular band with a hemispherical cross-section to provide a line contact seal with the box seal surface.

From the foregoing it will be appreciated that a primary object of the present invention is to provide a tubular pipe member having an external pin seal surface that can be repaired or reconstructed if the seal is improperly machined or becomes damaged from handling or use.

It is also an object of the present invention to provide an improved external seal for protecting the engaged threads in a pin and box connection from exposure to corrosive fluids surrounding the connection.

BRIEF DESCRIPTION OF THE DRAWINGS

FIG. 2 is a quarter sectional view of a modified coupling and pipe connection of the present invention illustrating a line-contact, hemispherical metal-to-metal seal forming an external seal between the pin and box connection of the present invention;

FIG. 3 is a quarter sectional of view of a modified coupling and pipe connection of the present invention illustrating a metal-to-metal line-contact hemispherical seal and an elastomeric seal ring forming an external seal between the pin and box connection of the present invention;

FIG. 3A is a detailed cross sectional illustration of the external seal of the connector of FIG. 3 of the present invention;

FIG. 4 is an enlarged to cross sectional view illustrating details in the formation of a weld bead forming a replaceable pin seal base on which a pin seal surface may be machined; and FIG. 5 is an enlarged cross sectional view illustrating details in the placement of an annular metal ring about a pin connector forming a replaceable pin seal base on which a pin seal surface may be machined.

DETAILED DESCRIPTION OF PREFERRED EMBODIMENTS

Figure 1:
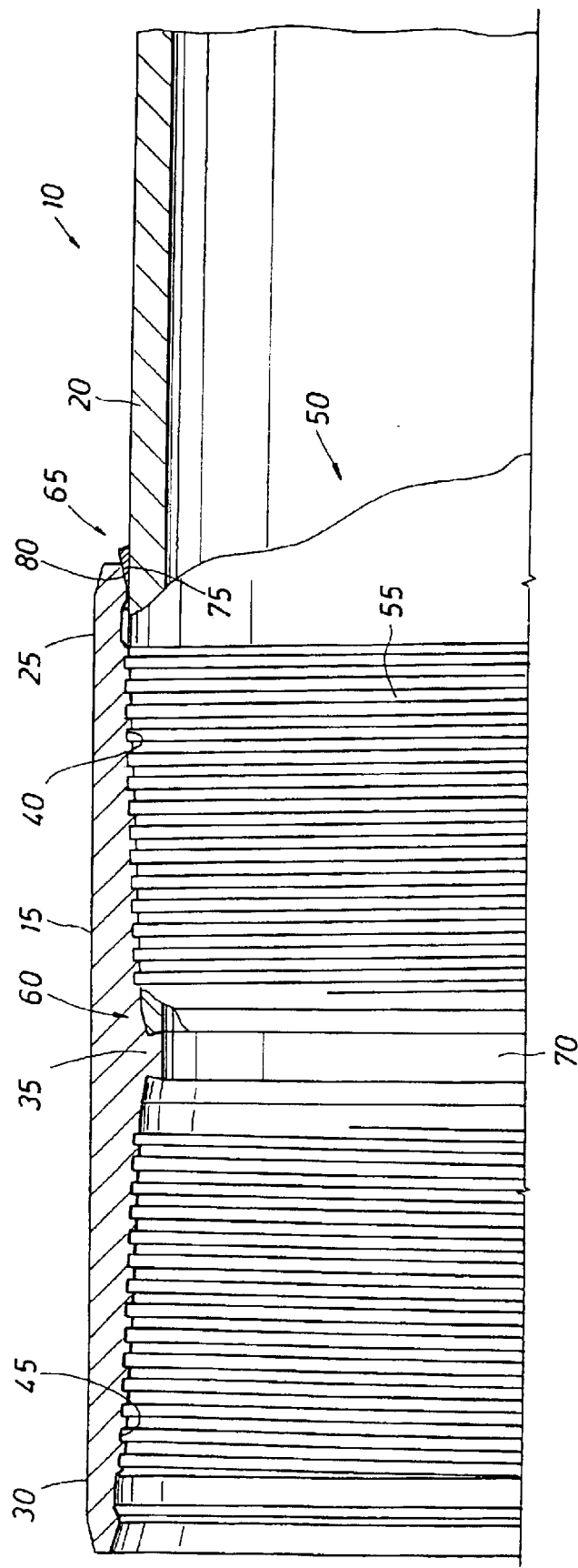
FIG. 1 is a quarter section view, partially broken away, illustrating a frustroconical metal-to-metal sealing surface forming an external seal between a coupling box end and a pipe pin end of the present invention.

FIG. 1 of the Drawings illustrates a coupling and pin connection of the present invention indicated generally at 10. The connection 10 is formed by the engagement of a coupling 15 and pipe 20. The coupling 15 is provided with internally threaded boxes 25 and 30 extending axially from either end of a central coupling area 35. Threads 40 are formed internally of the box 25 and threads 45 are formed internally of the box 30. The pipe 20 is externally threaded to form a pin indicated generally at 50. Threads 55 formed on the external surface of the pin 50 are illustrated fully engaged with the box threads 40. The coupling 15 is dimensioned axially to extend over the entire threaded area occupied by the threads 55.

The connection 10 provides an internal seal 60 and an external seal 65 that protect the threads 40 and 55 from contact with the fluids external and internal to the coupling and pipe. The threads 55 preferably runout to the external surface of the pipe 20 and terminate in a "last scratch" before reaching the external seal 65. The internal seal 60 is provided by the metal-to-metal engagement of the axial end area of the pin 50 with the surrounding wall of the coupling and an internal coupling shoulder 70.

Figure 1A:
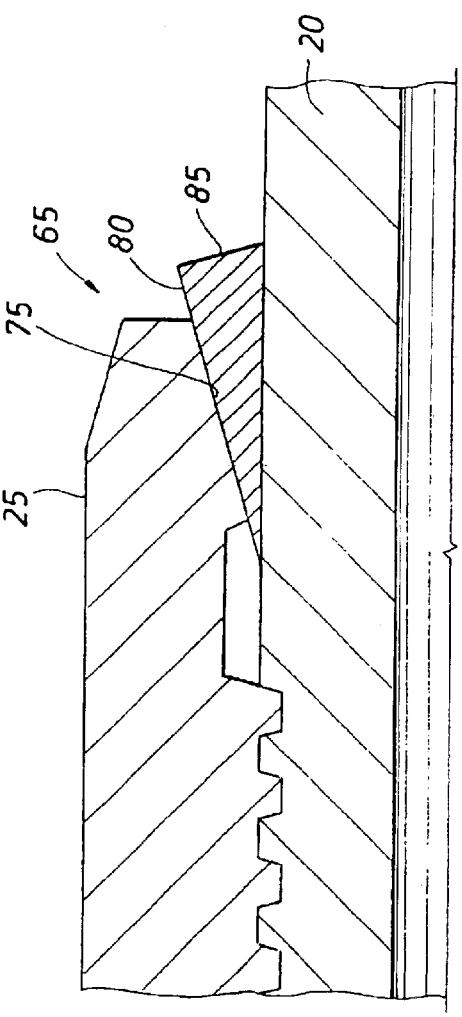
FIG. 1A is a detailed cross sectional illustration of the external seal of the connector the present invention.

As best illustrated in FIG. 1A, the external seal 65 is provided by the engagement of a frustroconical sealing surface 75 formed internally adjacent the open end of the box 25 with a corresponding frustroconical sealing surface 80 formed externally of a replaceable annular pin seal base 85. The annular pin seal base 85 is welded or otherwise securely connected to the external surface of the pipe 20.

The pin seal base 85 preferably is secured to or formed on the pipe 24, before the pin threads 55 are machined on the end of the pipe 20. The seal base 85 may be applied to the pipe 20 as a weld bead with a cross section as indicated in FIG. 4 or it may be applied as a separate metal ring having a cross section as indicated in FIG. 5. During the process of machining the threads 55 on to the pin end, the seal base is machined to produce the cross sectional shape illustrated in FIG. 1A. It will be appreciated that, in some applications, the seal base 85 may be preformed in the cross sectional shape illustrated in FIG. 1A and thereafter secured to the pipe 20, eliminating the need for any further machining.

Where a line contact external seal is desired, the pin seal base may be machined into a hemispherical seal 90 secured to a pipe 95 as illustrated in FIGS. 2, 3 and 3A. As with the frustroconical seal illustrated in FIG. 1, the seal 90 may be constructed by securing a preformed metal ring with a hemispherical cross-section to the pipe 95 to eliminate the requirement for machining after the pin seal base is secured to the pipe. In the preferred form of the Invention however, the hemispherical seal is machined with transitions on to the pipe body with radius fillets 96 and 97, as illustrated in FIG. 3A, to prevent stress risers.

When the material providing the pin seal base is improperly machined or damaged during handling or use, the material forming the pin seal base may be ground off or otherwise removed from the external surface of the pipe. The described process for forming a weld bead or adding an annular ring may then be repeated to construct the desired pin seal surface.

FIGS. 2 and 3 illustrate a modified coupling 15a with a box 30a in which the external metal-to-metal line contact seal is supplemented with an annular, elastomeric seal ring 100. The seal ring is received in an annular groove 105 formed internally of the end of the box 30a.

FIG. 4 illustrates a cross section of an annular weld bead 110 provided about the external circumference of a pipe 115. A dotted outline cross section 120 illustrates the cross sectional shape of the external pin surface remaining after the machining process.

FIG. 5 illustrates a cross section of an annular metal ring 125 secured circumferentially externally to a pipe 130. A dotted outline cross section 135 illustrates the cross sectional shape of the external pin surface remaining after the machining process. It will be appreciated that the beginning cross sectional dimensions of the weld bead or of the annular metal ring forming the external pin seal base are selected to accommodate the desired final configuration of the external seal.

While preferred forms of the present invention have been described in detail herein, it will be appreciated that other forms, modifications and variations of the present invention may be made without departing from the spirit or scope of the invention, which is more fully defined within the terms of the following Claims.

What is claimed is:

1. A connector for connecting together two tubular bodies, comprising:

a pin having pin threads formed externally on an end of a first tubular body, said pin threads extending from a starting point on said first tubular body and terminating adjacent the free pin end, wherein said pin threads run out to an outside diameter of said first tubular at said starting point of said pin threads, a box having box threads formed internally on an end of a second tubular body, said box threads extending from a starting point on said second tubular body and terminating adjacent the free box end, said pin adapted to be received in and threadedly engaged within said box, an external seal between said pin and said box adjacent said pin thread starting point and adjacent said free box end, said external seal comprising a pin seal surface formed on said pin on a third tubular body comprising a metal seal base separately added to said first tubular body, and an internal seal adjacent said box threads starting point and said free pin end whereby said pin threads and said box threads are confined between said external and internal seals when said pin and box are engaged; and said internal seal is defined by direct contact between surfaces of said first and second tubular bodies without an intermediate sealing member.

2. A connector as defined in claim 1 wherein said pin seal surface is formed on an annular metal ring comprising said metal seal base secured to said first tubular body.

3. A connector as defined in claim 1 wherein said pin seal surface is formed on a weld bead comprising said metal seal base secured to said first tubular body.

4. A connector as defined in claim 1 wherein said pin threads and said box threads are fully confined between said external and internal seals when said pin and box are engaged.

5. A connector for connecting together two tubular bodies, comprising:

a pin having pin threads formed externally on an end of a first tubular body, said pin threads extending from a starting point on said first tubular body and terminating adjacent the free pin end, a box having box threads formed internally on an end of a second tubular body, said box threads extending from a starting point on said second tubular body and terminating adjacent the free box end, said pin adapted to be received in and threadedly engaged with said box, an external seal between said pin and said box adjacent said pin thread starting point and adjacent said free box end, said external seal comprising a separately constructed annular body of metal secured on said pin end of said first tubular body, and an internal metal-to-metal seal formed integrally on surfaces of said first and second tubular bodies adjacent said box threads starting point and said free pin end whereby said pin threads and said box threads are confined between said external and internal seals when said pin and box are engaged.

6. A connector as defined in claim 5 wherein said body of metal is provided with a hemispherical cross-section to provide a line contact seal surface with said box end of said second tubular body.

* * * * *